UNITED STATES PATENT OFFICE.

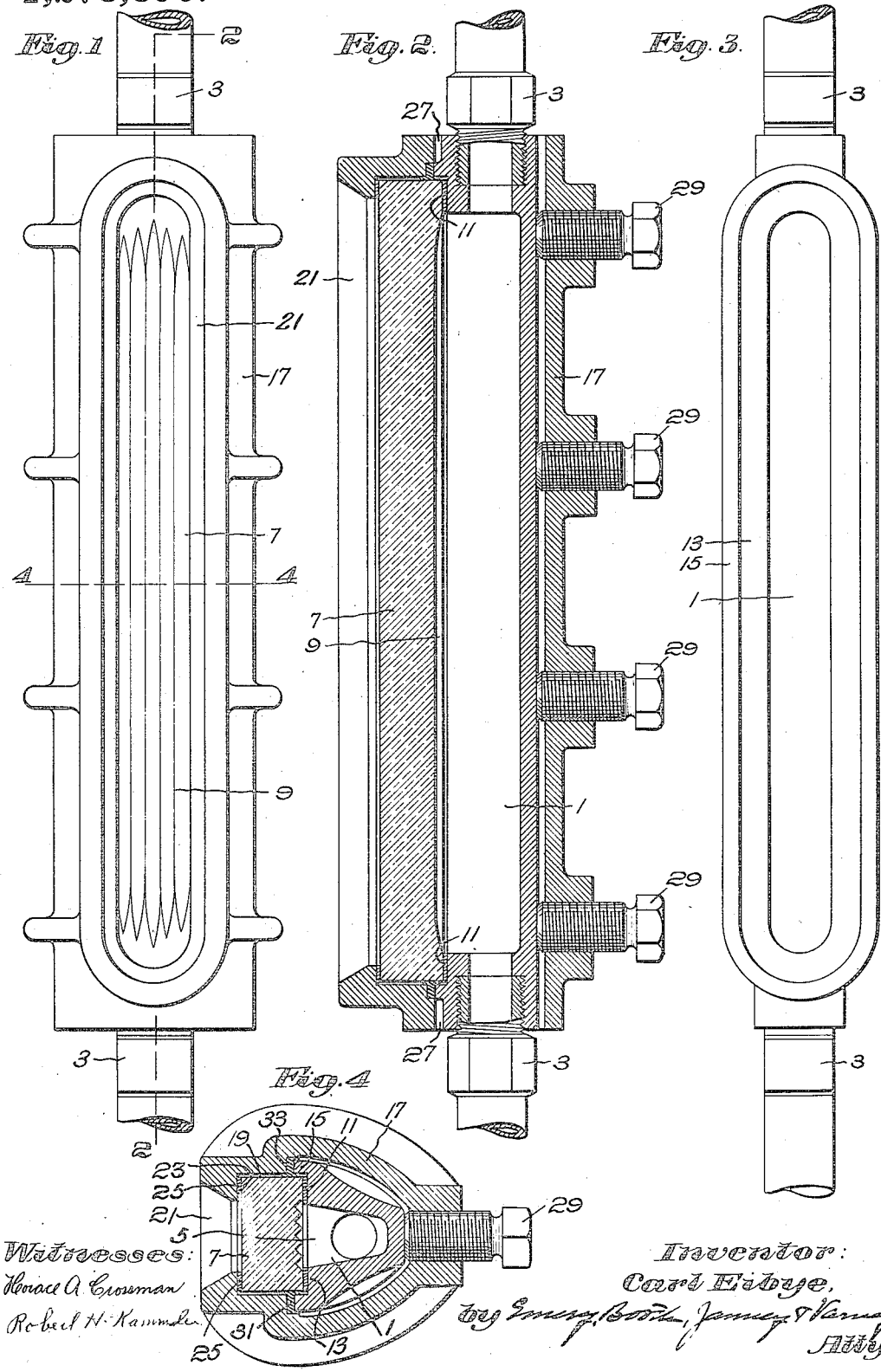

CARL EIBYE, OF EAST BOSTON, MASSACHUSETTS.

GAGE.

1,278,890.

Specification of Letters Patent. Patented Sept. 17, 1918.

Application filed November 4, 1912. Serial No. 729,334.

*To all whom it may concern:*

Be it known that I, CARL EIBYE, a subject of the King of Denmark, and a resident of East Boston, in the county of Suffolk and Commonwealth of Massachusetts, have invented an Improvement in Gages, of which the following description, in connection with the accompanying drawings, is a specification, like characters on the drawings representing like parts.

This invention relates to gages, such for example as are used for disclosing the water level in locomotive, marine and other high pressure boilers; and among other objects provides a gage which is simple and light in construction, and without liability of leakage.

The character of the invention may be best understood by reference to the following description of an illustrative embodiment thereof shown in the accompanying drawing, wherein:

Figure 1 is a front elevation of an illustrative gage embodying the invention;

Fig. 2 is a section taken on line 2—2 of Fig. 1;

Fig. 3 is a front elevation of a part of the gage, separated from its casing; and Fig. 4 is a section taken on line 4—4 of Fig. 1.

Referring to the drawing, the illustrative gage there shown as embodying the invention comprises a container 1 having ends threaded for connection with pipes 3, 3 leading to the boiler. To disclose the level of the water in the container it may be provided with an elongated aperture 5 on which may be placed an elongated glass 7 or other suitable transparent means. To enable the water level to be readily disclosed the glass may be provided on its rear face with usual facets 9 which render the water level clear cut and distinct.

A packing 11 of fiber or other suitable material may be interposed between the rear face of the glass and the container. Preferably this packing is set in a recess 13 in the container formed by a lip projection 15 overlapping or surrounding the glass for a purpose more fully hereinafter described.

To secure the glass tightly to the container a casing 17 is provided formed to receive the glass and container. This casing may be formed to present a pocket 19 for loosely receiving the glass and shaped to conform substantially to the contour thereof. To permit the visualization of the glass the base of this pocket is provided with an elongated sight aperture 21. This aperture may be surrounded by a ledge or packing bearing surface 23 on which may be placed a packing 25 of fiber or other suitable material. The glass will rest on this packing and be cushioned by it.

To permit a ready assembly of the parts and provide a strong casing, the latter may be provided with end openings 27, through either of which the glass may be introduced and set into its pocket and through which the container may be inserted and positioned over the glass.

To secure the parts together, the casing may be provided with suitable pressure means typified herein as a series of screws 29 entered through threaded holes in the back of the receiver into engagement with the back of said container. When these screws are set up they will react through the receiver and press the glass and container tightly to the packings between them.

The high pressure and heat to which gages of this type are subjected tend to cause leakage between the glass and container. In the attempt to prevent this a large heavy glass has been hitherto used and a correspondingly large container and packing between them to provide a large extent of packing bearing surface. This necessitated a large and heavy casing to receive the glass and container. As a result, the whole gage was rendered unduly large and heavy. This was found to be objectionable, for the reason that in the rack and wear which locomotive gages necessarily experience, the heavy gage tended to tear itself from its fittings and cause leakage. This made necessary objectionably large, heavy and expensive fittings.

One of the purposes of the invention is to overcome the above objections and provide a comparatively light gage which at the same time will be sufficiently strong to prevent leakage.

As stated, the leakage is most likely to occur past the packing between the glass and container. One of the objects of the invention is to confine any leakage which may escape past said packing. To this end a packing 31 is provided shown herein as surrounding the glass and interposed between the container lip projection 15 referred to and a packing bearing surface or ledge 33 surrounding the glass. This packing may be of a composition including rubber, fiber, asbestos or other suitable material, but it should be sufficiently compressible to yield and permit the adjustment of the container and glass tightly to the packing between them, and the adjustment of the receiver and glass tightly to the packing between them. As a result, when the screws at the back of the receiver are set up all of the parts will be set tightly to their packings.

In setting up the screws to tighten the parts to their packings the packing 31 is compressed to permit the glass to be set tightly to the packings 11 and 25 on the opposite sides thereof. This compression on the packing 31 distorts or spreads the same and causes the inner edge thereof to be pressed tightly to the side walls of the glass, thereby preventing leakage past said packing. This compression also spreads the outer edge of the packing into tight engagement with the casing wall surrounding the same and prevents leakage at this point. If by any possibility leakage should escape past the container-casing packing along the glass toward the face of the latter, it will be arrested by the casing-packing 25. Thus three packings are provided, two of which are in a sense emergency packings in readiness to become effective in case of leakage past the container-glass packing. The latter packing is called upon to withstand the very high pressure present in the container, but the other packings are not exposed to this high pressure and therefore are not liable to be called upon to withstand any very considerable pressure. Therefore, they are certain to be effective to confine any leakage escaping past or through the container-glass packing. As a result, by the construction described the likelihood of leakage from the gage is reduced to a minimum.

The provision of the means for confining any leakage escaping past the packing between the glass and container enables the use of a narrower packing thereat and a narrower glass, a narrower container, and a smaller receiver. As a result, the gage as a whole is lighter, cheaper to manufacture, and permits the use of lighter fittings, and is not likely to be torn or loosened from the latter.

While the leak preventing construction is described in connection with a gage in which the glass and container are held together by a series of screws coöperating with a casing receiving the glass and container, it will be understood that this securing means is selected as illustrative merely and that other types of securing means may be used if desired.

Having described one embodiment of the invention without limiting the same thereto, what I claim as new and desire to secure by Letters Patent is:

1. A gage comprising, in combination, a fluid container having a sight aperture therein; transparent means therefor; packing between them; a casing for said container and transparent means; and means to confine any leakage escaping past said packing including packing sufficiently compressible to permit the adjustment of the container and transparent means tightly to the packing between them.

2. A gage comprising, in combination, a container having an opening; transparent means therefor; packing between them; a receiver for said container and transparent means; packing between said transparent means and receiver; and packing between said receiver and container sufficiently compressible to permit the adjustment of the transparent means and receiver container, transparent means and receiver tightly to the packings between them.

3. A gage comprising, in combination, a container having a sight aperture therein, transparent means therefor; packing between them; a receiver for said container and transparent means; packing between the latter and said receiver; and packing engaging said transparent means and located between said container and receiver, said packings being spaced from one another.

4. A gage comprising, in combination, a container having an opening; transparent means therefor; packing between them; a receiver for said container and transparent means; and means to confine any leakage escaping past said packing including packing interposed between said container and receiver.

5. A gage comprising, in combination, a container having a recess therein; transparent means for said container; packing in said recess between said container and said transparent means; a receiver for said container and transparent means; and means to confine any leakage escaping past said packing including packing between said container and receiver.

6. A gage comprising, in combination, a container having an opening; transparent means therefor; packing between them, said container having a lip projection; a receiver for said container and transparent means; and packing between said lip projection and receiver.

7. A gage comprising, in combination, a container having an elongated aperture therein and provision for connection with fluid conducting means; transparent means over said aperture; packing interposed between said container and transparent means; a receiver for said transparent means and container, said receiver and container having opposed bearing portions; packing interposed between said portions, and means to press said container, receiver and transparent means tightly to the packings between them.

8. A gage comprising, in combination, a receiver having a sight opening and an end opening, said receiver having a packing bearing surface extending around said sight opening; a packing for said surface; a glass adapted to be introduced through said end opening; a pressure container adapted to be introduced through said end opening to a position over said glass; screw pressure means whereby said container is forced toward said glass; packing between said glass and container, said container and receiver being formed to present opposed bearing portions, and packing means interposed between said portions.

9. A gage of the character set forth, comprising a casing having spaced walls, a sight glass located in the casing between the walls and spaced therefrom, packing located in each of said spaces and interposed between each edge of the sight glass and the adjacent walls, and means other than the glass and bearing against the rear side of each packing for compressing the packing in one direction and thereby expanding it laterally against the edge of the glass and the adjacent wall.

In testimony whereof, I have signed my name to this specification in the presence of two subscribing witnesses.

CARL EIBYE.

Witnesses:
  HENRY T. WILLIAMS,
  EVERETT S. EMERY.